US012180948B2

(12) United States Patent
Hewitt et al.

(10) Patent No.: US 12,180,948 B2
(45) Date of Patent: Dec. 31, 2024

(54) HYDRAULIC PUMP SYSTEM

(71) Applicant: J. C. Bamford Excavators Limited, Uttoxeter (GB)

(72) Inventors: James Hewitt, Uttoxeter (GB); Paul Brenner, Uttoxeter (GB); Ravi Shankar, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 17/689,980

(22) Filed: Mar. 8, 2022

(65) Prior Publication Data

US 2022/0282718 A1 Sep. 8, 2022

(30) Foreign Application Priority Data

Mar. 8, 2021 (GB) ..................................... 2103209

(51) Int. Cl.

| | |
|---|---|
| ***F04B 17/03*** | (2006.01) |
| ***F04B 15/02*** | (2006.01) |
| ***F04B 23/02*** | (2006.01) |
| ***F04B 23/04*** | (2006.01) |
| ***F04B 49/06*** | (2006.01) |

(Continued)

(52) U.S. Cl.

CPC .............. *F04B 17/03* (2013.01); *F04B 15/02* (2013.01); *F04B 23/023* (2013.01); *F04B 23/04* (2013.01); *F04B 49/20* (2013.01); *F04B 53/16* (2013.01); *F04B 53/20* (2013.01); *F15B 1/26* (2013.01); *F04B 49/065* (2013.01); *F04B 53/002* (2013.01); *F04B 53/22* (2013.01)

(58) Field of Classification Search

CPC .......... F04B 17/03; F04B 15/02; F04B 23/02; F04B 23/023; F04B 23/04; F04B 49/20; F04B 53/16; F04B 53/20; F04B 23/021; F04B 49/06; F04B 49/065; F04B 53/002; F04B 53/22; F15B 1/26

See application file for complete search history.

(56) References Cited

U.S. PATENT DOCUMENTS 2,456,339 A * 12/1948 Stricklin ................ F04B 53/00 417/454
3,212,280 A * 10/1965 Thomas .................. F04B 53/00 417/520

(Continued)

FOREIGN PATENT DOCUMENTS

DE 4120665 A1 12/1992
DE 19612582 A1 10/1997

(Continued)

OTHER PUBLICATIONS

DE19959022 translation (Year: 2023).*

(Continued)

*Primary Examiner* — David N Brandt
(74) *Attorney, Agent, or Firm* — MARSHALL, GERSTEIN & BORUN LLP

(57) ABSTRACT

A hydraulic pump system includes a housing defining a tank for containing hydraulic fluid in use; one or more pump modules each comprising a hydraulic pump for supplying hydraulic fluid from the tank to a hydraulic system; and a mounting arrangement; wherein the or each pump module is mounted to the housing by the mounting arrangement.

22 Claims, 9 Drawing Sheets

(51) Int. Cl.

| | |
|---|---|
| ***F04B 49/20*** | (2006.01) |
| ***F04B 53/00*** | (2006.01) |
| ***F04B 53/16*** | (2006.01) |
| ***F04B 53/20*** | (2006.01) |
| ***F04B 53/22*** | (2006.01) |
| ***F15B 1/26*** | (2006.01) |

(56) References Cited

U.S. PATENT DOCUMENTS

| | | | | |
|---|---|---|---|---|
| 4,047,845 | A * | 9/1977 | Reeve | F04B 23/023 417/258 |
| 10,378,525 | B2 * | 8/2019 | Nakamura | F04C 15/0073 |
| 2007/0289994 | A1 * | 12/2007 | Kotyk | B67D 7/16 222/386 |
| 2013/0243610 | A1 * | 9/2013 | Conley | F04B 49/065 417/53 |
| 2014/0116038 | A1 | 5/2014 | Pfaff et al. | |
| 2018/0051444 | A1 | 2/2018 | Yamashita et al. | |
| 2018/0051720 | A1 | 2/2018 | Hijikata et al. | |
| 2018/0106278 | A1 | 4/2018 | Amano et al. | |
| 2018/0320674 | A1 | 11/2018 | Clev | |
| 2019/0186105 | A1 * | 6/2019 | Imura | E02F 9/22 |
| 2019/0393816 | A1 * | 12/2019 | Chedygov | H02K 11/33 |

FOREIGN PATENT DOCUMENTS

| | | | | |
|---|---|---|---|---|
| DE | 19959022 | C1 * | 6/2001 | F04B 17/03 |
| DE | 102019003342 | A1 * | 11/2020 | F15B 11/17 |
| EP | 0533958 | A1 | 3/1993 | |
| EP | 0857871 | A1 | 8/1998 | |
| EP | 1750017 | A1 | 2/2007 | |
| EP | 2541072 | A2 | 1/2013 | |
| EP | 3489424 | A1 | 5/2019 | |
| EP | 3674563 | A1 | 7/2020 | |
| EP | 3779209 | A1 * | 2/2021 | B66F 9/07518 |
| JP | 2019199726 | A | 11/2019 | |
| WO | WO-2014/036232 | A1 | 3/2014 | |
| WO | WO-2017/077060 | A1 | 5/2017 | |

OTHER PUBLICATIONS

DE102019003342 translation (Year: 2023).*

Perlite.org; Perlite in Sound Insulation Applications—Perlite Institute pdf from perlite.org/perlite-in-sound-insulation-applications/ from Jan. 2021 (Year: 2021).*

EP-3779209 translation (Year: 2023).*

Search Report for GB2103208, dated Nov. 24, 2021.

Search Report for GB 2103209.9, dated Nov. 26, 2021.

* cited by examiner

HYDRAULIC PUMP SYSTEM

FIELD

The present disclosure relates to a hydraulic pump system, a pump module for a hydraulic pump system and a working vehicle including a hydraulic pump system.

BACKGROUND

Working vehicles such as excavators, backhoe loaders, telehandlers, skid-steer loaders, dumpers and the like often have one or more hydraulically actuated devices such as working arm actuators, track motors, bucket actuators etc. Such hydraulically actuated devices operate by receiving a flow of hydraulic fluid from a hydraulic pump.

Typically, the hydraulic pump of a working vehicle receives hydraulic fluid from the reservoir via a first pipe and supplies hydraulic fluid to a hydraulic system via a second pipe. When the hydraulic pump is to be removed/replaced for maintenance or repair, the first and second pipes are disconnected and the hydraulic pump is de-mounted from the working vehicle. Such an arrangement is therefore time-consuming and awkward to maintain and replace. Furthermore, energy losses along the length of the first pipe reduce the efficiency of the hydraulic system.

In standard working vehicles driven by an internal combustion engine (ICE), the hydraulic pump is typically driven by the ICE. That is, the hydraulic pump includes a drive shaft which is coupled (either directly, or via a gearbox) to an output shaft of the ICE, so that the hydraulic pump outputs a flow of hydraulic fluid whenever the ICE is running.

Since a flow of hydraulic fluid is not required by the hydraulically actuated device(s) of the working vehicle at all times when the ICE is running, excess output from the hydraulic pump is returned to the hydraulic reservoir via a bypass circuit/relief valve. Alternatively, a swash angle of the pump is altered to reduce the output of hydraulic fluid from the hydraulic pump. In either case, the ICE-driven pump arrangement leads to reduced efficiency of the hydraulic system, since the pump is being driven unnecessarily when no flow of hydraulic fluid is required.

The present disclosure seeks to overcome, or at least mitigate, one or more problems of the prior art.

SUMMARY

According to a first aspect of the disclosure, a pump system is provided, the pump system comprising:

a housing defining a tank for containing fluid (e.g. hydraulic fluid) in use; and one or more pump modules each comprising a pump for supplying fluid from the tank to a fluid system (e.g. hydraulic system);

a mounting arrangement;

wherein the or each pump module is mounted to the housing by the mounting arrangement.

Mounting the pump module(s) (i.e. as attachable/detachable self-contained units) to the housing provides a self-contained pumping assembly and reduces or removes the length of piping needed to connect the pump(s) to fluid (e.g. hydraulic fluid) contained in the tank. This reduces the complexity of the system and reduces or removes energy losses which would occur along such piping. This is particularly beneficial for working vehicles, such as battery-powered working vehicles where reduced energy losses result in increased battery life, or fuel cell powered working vehicles where reduced energy losses result in reduced fuel consumption.

In addition, this arrangement is more compact than prior art systems in which the pump(s) are provided separate from the tank.

Furthermore, having pump modules (i.e. attachable/detachable self-contained units) allows the pump modules to be installed or removed from the pump system without having to connect/disconnect interconnected components within the module. This simplifies the procedure for removal/replacement of pumps for repair or maintenance.

Optionally, the pump system is a hydraulic pump system for supplying hydraulic fluid from the tank to a hydraulic system.

Optionally, the pump system comprises a plurality of pumps, optionally three pumps.

Having a plurality of pumps allows fluid (e.g. hydraulic fluid) to be supplied to multiple circuits more efficiently than if a single pump and flow sharing valves were used.

Optionally, the mounting arrangement comprises a single mounting portion (e.g. mounting plate) and each pump is mounted to the housing via the single mounting portion.

Having such a single mounting portion provides a simple means to install/remove the pumps together from the housing (e.g. for access to an interior of the housing for cleaning/maintenance).

Optionally, the mounting portion (e.g. mounting plate) comprises a lid for the housing.

Optionally, the mounting arrangement comprises a plurality of mounting portions and each pump is mounted to the housing via one of the mounting portions Optionally, the or each pump module comprises a mounting portion and is mounted to the housing by said mounting portion.

Optionally, the or each pump comprises a body, and wherein the body extends at least partially into the tank.

Having a body of the pump(s) extending at least partially into the tank (i.e. into an interior region defined by the housing) provides a compact arrangement (since at least part of the body of the pump is within an interior of the housing) which is useful in space-constrained environments, such as mobile vehicles (e.g. working vehicles).

Optionally, the housing comprises an outer casing and an inner liner spaced apart from the outer casing to define a cavity therebetween.

Such a cavity in a two-part housing reduces the transmission of sound generated by the one or more pumps from within the tank to an exterior of the housing. It will be understood that the liner of such a housing defines an interior wall of the tank.

Optionally, the cavity contains sound absorbing material.

Such sound absorbing material further reduces the amount of noise generated by the one or more pumps that is transmitted to the exterior of the tank.

Optionally, the outer casing comprises an inwardly extending projection (e.g. flange) and/or the inner liner comprises an outwardly extending projection (e.g. flange) configured to space the liner from the outer casing.

Such projection(s) facilitate correct alignment of the inner liner within the casing (e.g. so that a width of the cavity is approximately equal around a perimeter of the housing). Furthermore, such projection(s) being provided on the outer casing and/or inner liner removes the need for separate spacing components.

Optionally, one or more spacers are provided within the cavity between the inner liner and the outer casing.

Such spacer(s) facilitate correct alignment of the inner liner within the casing (e.g. so that a width of the cavity is approximately equal around a perimeter of the housing).

Optionally, the outer casing comprises an open end comprising a rim and the inner liner comprises an end comprising an outwardly extending projection (e.g. flange) for engaging the rim.

Such an arrangement provides a simple means for constructing the two-part housing.

Optionally, the rim comprises an inwardly extending projection (e.g. flange), and the outwardly extending projection of the inner liner engages the inwardly extending projection of the outer casing.

In this way, the inwardly-extending projection of the outer casing acts to space the liner from an outer wall of the outer casing, whilst also provided a greater surface area for contact with the outwardly extending projection of the inner liner (e.g. to provide an increased surface area for welding or for receiving one or more bolts therethrough).

Optionally, the outer casing is formed of plastics material or metallic material (e.g. steel or aluminium).

Optionally, the inner liner is formed of plastics material or metallic material (e.g. steel or aluminium).

The housing components can be easily formed from such materials. These materials have also been found to be suitable for reducing noise in tanks in combination with the cavity and/or sound absorbing material above.

Optionally, the housing defines one or more apertures for receiving the one or more pump modules.

Having one or more apertures for receiving the pump modules, provides a simple means for mounting the pump modules to the housing.

Optionally, the mounting arrangement comprises one or more plates or flanges each for surrounding a perimeter of one of said one or more apertures of the housing.

Having a plate or flange which surrounds a perimeter of one of said apertures of the housing allows the aperture to be completely covered by the plate or flange (which is useful for preventing ingress of dirt or debris, and/or leakage of fluid from the aperture). Such a plate or flange also provides an abutment surface which indicates when the pump module has been correctly positioned relative to the housing.

Optionally, the mounting arrangement (e.g. a single mounting plate, or a plurality of mounting plates/flanges) is mounted to the housing via a releasable fastening.

Having a releasable fastening allows the pump module(s) to be easily removed/installed for maintenance or replacement purposes.

Optionally, one of the mounting arrangement and housing comprises one or more through-holes or threaded holes and the other of the mounting portion and housing comprises a corresponding one or more threaded holes or through-holes, wherein the or each through-hole and threaded hole is provided for receiving a bolt to couple said mounting arrangement to the housing.

Having an arrangement which is suitable for coupling via one or more bolts provides a simple means of releasably mounting the pump module(s) to the housing via the mounting arrangement.

Optionally, the pump system further comprises one or more seals for sealing the one or more apertures.

The apertures being sealed allows the pump assembly to be used in any orientation (e.g. pump modules can be mounted on a top, side or lower surface of the housing) without leakage of fluid (e.g. hydraulic fluid). This provides a more flexible range of uses for the pump assembly. Furthermore, being sealed also prevents leakage in mobile applications where fluid may move around within the tank (e.g. in a working vehicle due to acceleration forces or inclined surfaces).

Optionally, the mounting arrangement comprises one or more mounting plates or flanges which at least partially surround a respective aperture of said one or more apertures of the housing, and wherein the or each mounting plate or flange further comprises a seal surface and/or seal provided on said mounting plate or flange for sealing said aperture.

A seal (e.g. a compressible seal such as a gasket) offers a reliable means of sealing an aperture, particularly under pressure (e.g. a bolting pressure exerted on the compressible seal when the mounting portion is secured to the housing via one or more bolts).

Optionally, each of the one or more pump modules comprises a body comprising an inlet portion which defines a pump inlet, and

- wherein the inlet portion of the body extends into the tank such that the pump inlet is immersed in fluid (e.g. hydraulic fluid) contained in the tank in use; and/or
- wherein the pump system further comprises a filter or strainer arrangement coupled to the pump inlet, wherein the inlet portion of the body extends into the tank such that the filter or strainer arrangement is immersed in fluid (e.g. hydraulic fluid) contained in the tank in use.

Having a pump inlet of the pump body immersed in fluid (e.g. hydraulic fluid) in the tank removes the need for pipework connecting the pump inlet to the fluid in the tank. This reduces the complexity of the system and reduces or removes energy losses which would occur along such piping. This is particularly beneficial for working vehicles, such as battery-powered working vehicles where reduced energy losses result in increased battery life, or fuel cell powered working vehicles where reduced energy losses result in reduced fuel consumption.

Optionally, each of the one or more pump modules comprises a pump outlet, and wherein the hydraulic pump system further comprises one or more fluid supply lines (e.g. hydraulic supply lines) connected to the one or more pump outlets for channelling fluid (e.g. hydraulic fluid) supplied by the one or more pump modules out of the housing.

Such a fluid supply line(s) allows fluid (e.g. hydraulic fluid) supplied by the pump(s) to be used outside the tank (e.g. to move actuators in a hydraulic system for a working vehicle).

Optionally, each of the fluid supply lines is coupled to the mounting arrangement, so that said fluid supply lines can be attached/detached from the pump system with the respective pump modules.

Each of the fluid supply lines being coupled to the mounting arrangement allows simple removal/replacement of pump modules with the mounting arrangement without having to connect/disconnect the fluid supply line from the associated pump outlet.

Optionally, the mounting arrangement comprises one or more fluid supply ports each coupled to a respective fluid supply line for connection to a fluid system (e.g. hydraulic system) in order to supply fluid (e.g. hydraulic fluid) from the pump module to the fluid system, wherein the fluid supply port is arranged to be external to the tank.

Such a fluid supply port allows the pump module(s) to be easily connected to a fluid system (e.g. to a hydraulic system for moving hydraulic actuators in a hydraulic system for a working vehicle).

Furthermore, the one or more fluid supply ports being provided on or by the mounting arrangement allows the pump(s) to be removed with the mounting arrangement without having to disconnect the fluid supply line(s) and/or downstream fluid connections (e.g. as opposed to having the port(s) on a fixed part of the housing, which would necessitate disconnecting the fluid supply line(s) from the respective port(s) and/or pump(s) when removing the pump(s) and mounting arrangement from the housing.

Optionally, each of the one or more pump modules further comprises an electric motor for driving the pump.

In embodiments with multiple pump modules, having an electric motor for each pump module allows flow of fluid from each module to be controlled independently of the other modules. This allows optimal pump flow rates to be set for each pump module, in contrast to prior art hydraulic systems that are driven by an internal combustion engine (ICE) which results in the hydraulic pump(s) outputting hydraulic fluid whenever the ICE is running (even if not required by hydraulically actuated devices of the hydraulic system). In other words, having an electric motor for each pump module leads to improved efficiency of the pump system, which is particularly beneficial for working vehicles, such as battery-powered working vehicles where increased pump system efficiency results in increased battery life, or fuel cell powered working vehicles where reduced energy losses result in reduced fuel consumption.

Optionally, the output of fluid (e.g. hydraulic fluid) from the pump of each of the one or more pump modules is controlled via rotation speed of the electric motor of said pump module; optionally, wherein the pump system further comprises one or more inverters for controlling frequency of power supplied to the one or more pump modules; optionally, wherein the one or more inverters are each mounted to the mounting arrangement or to a respective pump module, so that said one or more inverters can be attached/detached from the pump system with said one or more pump modules.

Having the pump(s) controlled via rotation speed of the electric motor(s) allows an optimal pump flow rate to be set for each pump module. This reduces the need for restrictions in downstream fluid systems (e.g. downstream hydraulic systems), which improves the efficiency of the associated fluid system.

Such an inverter arrangement enables variable speed control of the electric motor(s) and DC to AC power smoothing/conversion. This is useful in applications where the electric motors are powered by a DC electricity source (e.g. a battery on an electric working vehicle or a fuel cell on a fuel cell powered working vehicle).

Optionally, the pump system further comprises a controller configured to set the rotation speed of the or each electric motor based on one or more user inputs and/or one or more sensor inputs such as pump pressure and system temperature.

Such a controller allows an optimal pump flow rate to be set for each pump module, which leads to increased efficiency of a fluid system (e.g. hydraulic system) incorporating the pump system.

Optionally, the electric motor of each of the one or more pump modules is connected to the pump of said pump module by a common drive shaft or a gearbox.

Connecting a pump to an electric motor via a common drive shaft offers a simple and reliable means for driving the hydraulic pump by the electric motor.

Connecting a pump to an electric motor via a gearbox allows the electric motor and pump to each be run in their optimal rotational speed ranges (which may differ), which increases the efficiency of the pump system.

Optionally, the electric motor and/or inverter of at least one of the one or more pump modules is arranged to be positioned external to the tank.

Arranging the electric motor(s) to be external to the tank protects electrical components from short-circuiting or other damage caused be contact with hydraulic fluid.

Optionally, the pump system comprises a cover for said electric motor(s) and/or inverter(s).

Such a cover provides two functions. Firstly, the cover protects the external components (i.e. electric motor(s) and/or inverter(s)) from being damaged by impact or dirt/debris. Secondly, the cover reduces the transmission of noise generated by the external components, which results in a quieter pump system.

Optionally, the cover comprises sound-absorbing material (e.g. lined on an inside of the cover).

Such sound-absorbing material further reduces the transmission of noise from the pump system.

Optionally, the cover is formed of plastics material or metallic material (e.g. steel or aluminium).

The cover can be easily formed from such materials. These materials have also been found to be suitable for reducing noise transmission through the cover.

Optionally, the pump of each of the one or more pump modules is a fixed displacement pump.

Having an electric motor driving a fixed displacement pump eliminates the need for variable swash control to vary pump output, which allows an infinite range of output flow rates without inefficiency of partial displacement associated with variable swash plate piston pumps.

Optionally, the pump of each of the one or more pump modules is a bent axis piston pump.

Bent axis piston pumps have been found to offer a high displacement ratio due to large swash angles)(>40°, which results in a power dense package in comparison to axial piston pumps. This provides a high volumetric efficiency, which leads to an increased overall efficiency of the pump system.

Optionally, the pump system further comprises a filter arrangement for filtering fluid (e.g. hydraulic fluid) input to the tank (e.g. hydraulic fluid returning to the tank from a hydraulic system).

Having such a filter arrangement removes debris entrained in the fluid prior to entering the tank (e.g. debris formed via erosion of components in a hydraulic system) which improves the efficiency of the associated fluid system and reduces the likelihood of damage to components such as the pump.

Optionally, the filter arrangement is mounted on the housing or the mounting arrangement; optionally, wherein the filter arrangement extends at least partially into the tank.

Having the filter arrangement mounted on the housing and extending into the tank provides a compact and self-contained arrangement.

According to a second aspect of the disclosure, a working vehicle is provided, the working vehicle comprising a pump system as disclosed herein.

Optionally, the working vehicle is an electric working vehicle (e.g. a battery powered working vehicle).

Optionally, the working vehicle is a fuel cell powered working vehicle (e.g. comprising a hydrogen fuel cell for powering the working vehicle).

Optionally, the working vehicle is a hybrid working vehicle of the kind having an electric source of power and an alternative source of power.

The pump system of the first aspect of the disclosure is particularly compact and efficient. This provides significant benefits when applied to a working vehicle (where space is restricted and power is of limited capacity), particularly electric working vehicles where increased efficiency results in increased battery life and periods of use between charging, or fuel cell powered working vehicles where reduced energy losses result in reduced fuel consumption.

Optionally, the working vehicle is an excavator, backhoe loader, telehandler, skid-steer loader, dumper, forklift truck or other type of working vehicle having one or more hydraulically-actuated devices.

According to a third aspect of the disclosure, a pump module is provided, the pump module comprising a pump, an electric motor for driving the pump, and a mounting portion for mounting the pump module to a housing of a fluid tank in use.

Such a pump module (i.e. an attachable/detachable self-contained unit) is suitable for mounting directly to a housing of a fluid tank, which provides a compact arrangement. Furthermore, such an arrangement allows easy removal/replacement/maintenance of such modules.

Optionally, the pump is a hydraulic pump.

Optionally, the mounting portion is positioned such that a portion of the pump extends into said fluid tank when the pump module is mounted to said housing by the mounting portion in use.

Optionally, the mounting portion comprises a flange for surrounding a perimeter of an aperture of said housing when the pump module is mounted to said housing by the mounting portion in use.

Having a flange which surrounds a perimeter of an aperture of the housing allows the aperture to be completely covered by the mounting portion (which is useful for preventing ingress of dirt or debris, and/or leakage of fluid from the aperture). Such a flange also provides an abutment surface which indicates when the pump module has been correctly positioned relative to the housing.

Optionally, the mounting portion comprises a releasable fastening for releasably mounting the hydraulic pump module to said housing in use.

Having a releasable engagement formation provides a simple means of releasably mounting the pump module to the housing. This allows the pump module to be removed for maintenance or replaced easily.

Optionally, the mounting portion comprises a seal surface and/or seal configured to seal an aperture of said housing when the pump module is mounted to said housing by the mounting portion in use.

A seal (e.g. a compressible seal such as a gasket) offers a reliable means of sealing an aperture, particularly under pressure (e.g. a bolting pressure exerted on the compressible seal when the mounting portion is secured to the housing via one or more bolts). Furthermore, this allows the pump module to be fitted a housing of a fluid tank in any orientation (e.g. to a top, side or bottom surface) without leakage of fluid (e.g. hydraulic fluid).

Optionally, the electric motor is arranged to be positioned external to said fluid tank when the pump module is mounted to said housing by the mounting portion in use.

Arranging the electric motor to be external to the tank in use protects electrical components from short-circuiting or other damage caused be contact with fluid.

Optionally, the pump comprises a pump inlet and a pump outlet, wherein the pump module further comprises a fluid supply line connected to the pump outlet for channelling fluid (e.g. hydraulic fluid) supplied by the pump to a fluid system (e.g. a hydraulic system).

Having a fluid supply line as part of the pump module allows simple removal/replacement of the pump module from a housing of a tank without having to connect/disconnect the fluid supply line from the pump outlet.

Optionally, the fluid supply line is coupled to the mounting portion, so that said hydraulic supply lines can be attached/detached from said housing with the pump.

The fluid supply line being coupled to the mounting portion allows simple removal/replacement of the pump module without having to connect/disconnect the fluid supply line from the pump outlet.

Optionally, the mounting portion further comprises a fluid supply port coupled to the fluid supply line for connection to a fluid system (e.g. hydraulic system) in order to supply fluid from the pump module to the fluid system, wherein the fluid supply port is arranged to be external to said fluid tank when the pump module is mounted to said housing by the mounting portion in use.

Having a fluid supply port allows the pump module to be easily connected to a fluid system (e.g. a hydraulic system for moving hydraulic actuators of a working vehicle).

Optionally, the output of fluid from the pump is controlled via rotation speed of the electric motor.

Having the pump controlled via rotation speed of the electric motor allows an optimal pump flow rate to be set for the pump module. This reduces the need for restrictions in downstream fluid systems (e.g. valves in hydraulic circuits), which improves the efficiency of the associated fluid system.

Optionally, the pump module further comprises an inverter to control frequency of power supplied to the electric motor.

Having an inverter arrangement enables variable speed control of the electric motor(s) and DC to AC power smoothing/conversion. This is useful in applications where the electric motors are powered by a DC electricity source (e.g. a battery on an electric working vehicle, or a fuel cell in a fuel cell powered working vehicle).

Optionally, the electric motor is connected to the pump by a common drive shaft or a gearbox.

Connecting the pump to the electric motor via a common drive shaft offers a simple and reliable means for driving the pump by the electric motor.

Connecting the pump to the electric motor via a gearbox allows the electric motor and pump to each be run in their optimal rotational speed ranges (which may differ), which increases the efficiency of the pump module.

Optionally, the pump is a fixed displacement pump.

Having an electric motor driving a fixed displacement pump eliminates the need for variable swash control to vary pump output, which allows an infinite range of output flow rates without inefficiency of partial displacement associated with variable swash plate piston pumps.

Optionally, the pump is a bent axis piston pump.

Bent axis piston pumps have been found to offer a high displacement ratio due to large swash angles)(>40°, which results in a power dense package in comparison to axial piston pumps. This provides a high volumetric efficiency, which leads to an increased overall efficiency of the pump module.

According to a fourth aspect of the disclosure, a pump module is provided, the pump module comprising a pump and a mounting portion for mounting the pump module to a housing of a hydraulic fluid tank in use, wherein the mounting portion is configured to at least partially surround an aperture of said housing, and wherein the mounting portion comprises a seal surface and/or seal configured to seal said aperture when the pump module is mounted to said housing in use.

Such a pump module (i.e. an attachable/detachable self-contained unit) is suitable for mounting directly to a housing of a hydraulic fluid tank, which provides a compact arrangement. Furthermore, such an arrangement allows easy removal/replacement/maintenance of such modules.

In addition, a seal (e.g. a compressible seal such as a gasket) offers a reliable means of sealing an aperture, particularly under pressure (e.g. a bolting pressure exerted on the compressible seal when the mounting portion is secured to the housing via one or more bolts).

Optionally, the mounting portion is positioned such that a portion of the pump extends into said fluid tank when the pump module is mounted to said housing by the mounting portion in use.

Optionally, the mounting portion comprises a flange for surrounding a perimeter of said aperture when the pump module is mounted to said housing by the mounting portion in use;

Having a flange which surrounds a perimeter of an aperture of the housing allows the aperture to be completely covers by the mounting portion (which is useful for preventing ingress of dirt or debris, and/or leakage of fluid from the aperture). Such a flange also provides an abutment surface which indicates when the pump module has been correctly positioned relative to the housing.

Optionally, the mounting portion comprises a releasable fastening for releasably mounting the pump module to said housing in use.

Having a releasable engagement allows the pump module to be easily removed/installed to a housing for maintenance or replacement purposes.

According to a further aspect of the disclosure a fluid system is provided, the fluid system comprising:

- a housing defining a tank for containing fluid in use; and
- one or more components each comprising a body extending at least partially into the tank;
- wherein the housing comprises an outer casing and an inner liner spaced apart from the outer casing to define a cavity therebetween.

Such a cavity in a two-part housing reduces the transmission of sound generated by the one or more components from within the tank to an exterior of the housing. For example, where the one or more components are pumps, any noise generated by the pumps would be reduced by the two-part tank construction. It will be understood that the liner of such a housing defines an interior wall of the tank.

Optionally, the cavity contains sound absorbing material.

Such sound absorbing material further reduces the amount of noise generated by the one or more components that is transmitted to the exterior of the tank.

Optionally, the outer casing comprises an inwardly extending projection (e.g. flange) and/or the inner liner comprises an outwardly extending projection (e.g. flange) configured to space the liner from the outer casing.

Such projection(s) facilitate correct alignment of the inner liner within the casing (e.g. so that a width of the cavity is approximately equal around a perimeter of the housing). Furthermore, such projection(s) being provided on the outer casing and/or inner liner removes the need for separate spacing components.

Optionally, one or more spacers are provided within the cavity between the inner liner and the outer casing.

Such spacer(s) facilitate correct alignment of the inner liner within the casing (e.g. so that a width of the cavity is approximately equal around a perimeter of the housing).

Optionally, the outer casing comprises an open end comprising a rim and the inner liner comprises an end comprising an outwardly extending projection (e.g. flange) for engaging the rim.

Such an arrangement provides a simple means for constructing the two-part housing.

Optionally, the rim comprises an inwardly extending projection (e.g. flange), and the outwardly extending projection of the inner liner engages the inwardly extending projection of the outer casing.

In this way, the inwardly-extending projection of the outer casing acts to space the liner from an outer wall of the outer casing, whilst also provided a greater surface area for contact with the outwardly extending projection of the inner liner (e.g. to provide an increased surface area for welding or for receiving one or more bolts therethrough).

Optionally, the outer casing is formed of plastics material or metallic material (e.g. steel or aluminium).

Optionally, the inner liner is formed of plastics material or metallic material (e.g. steel or aluminium).

The housing components can be easily formed from such materials. These materials have also been found to be suitable for reducing noise in tanks in combination with the cavity and/or sound absorbing material above.

BRIEF DESCRIPTION OF THE DRAWINGS

Embodiments are now described by way of example only with reference to the accompanying drawings, in which.

DETAILED DESCRIPTION

Figure 1:
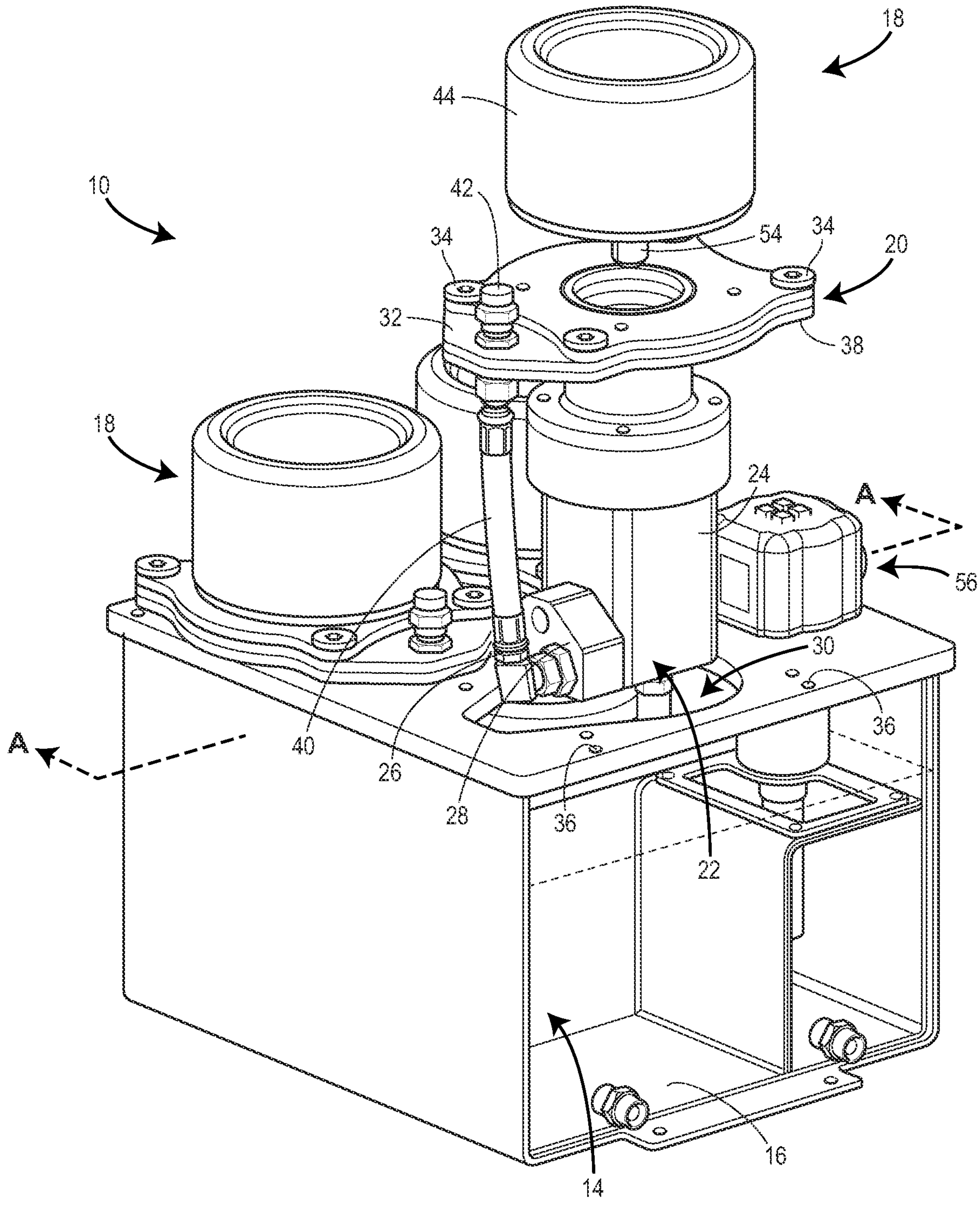
FIG. 1 is an exploded perspective view of a hydraulic pump system having three pump modules according to an embodiment.
Figure 2:
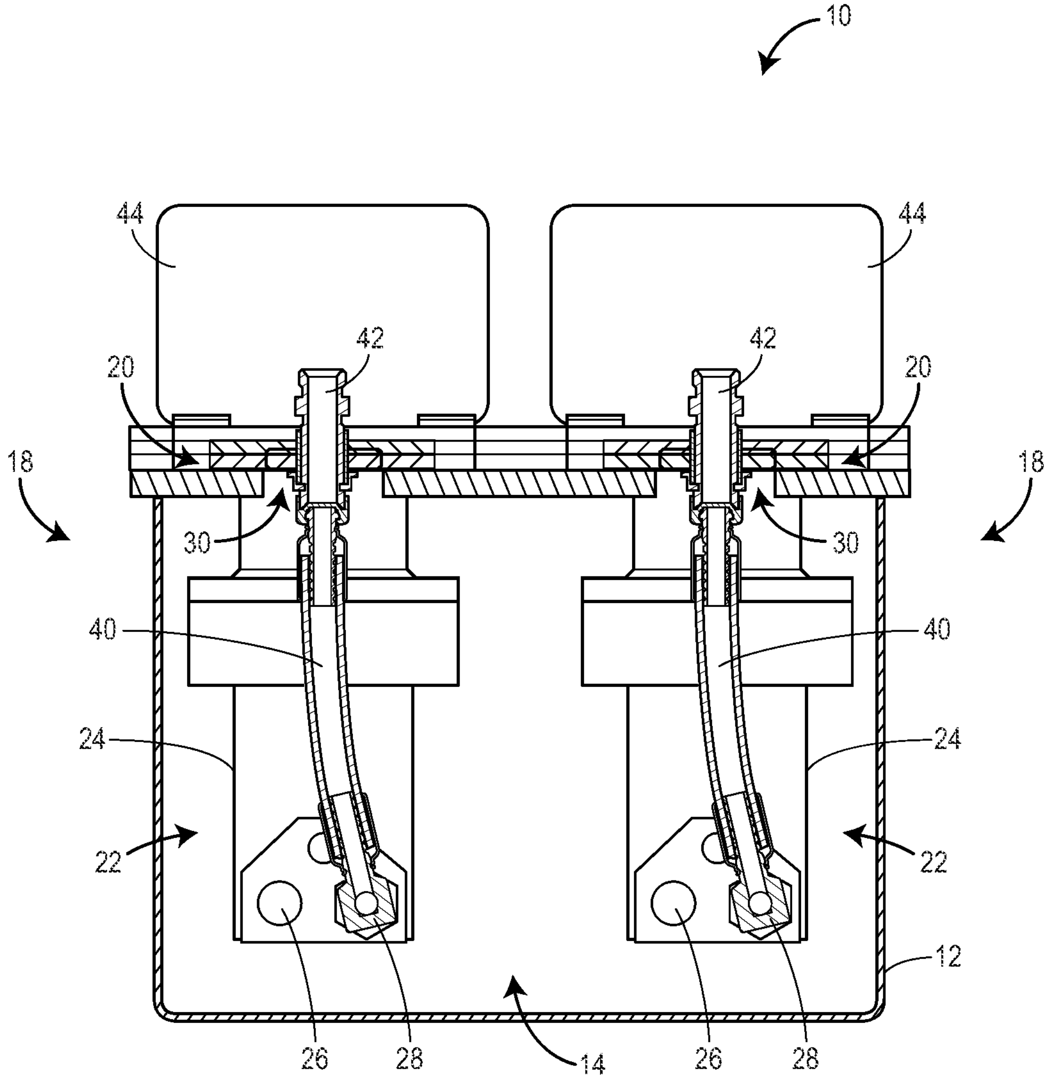
FIG. 2 is a cross-sectional side view of the hydraulic pump system of FIG. 1 taken along line A-A of FIG. 1.

Referring firstly to FIGS. 1 to 4, a hydraulic pump system according to an embodiment is indicated at 10. The hydraulic pump system 10 includes a housing 12 defining a tank 14 for containing hydraulic fluid 16 in use. In the illustrated embodiment, the hydraulic pump system also includes three pump modules 18 (one of which is obscured by the exploded/removed pump module 18 at the front of the figure). In alternative embodiments, more or fewer than three pump modules 18 are provided.

Each pump module 18 includes a mounting portion 20 and a hydraulic pump 22 for supplying hydraulic fluid 16 from the tank 14 to a hydraulic system (e.g. a hydraulic system of a working vehicle).

Each pump module 18 is mounted to the housing 12 by the mounting portion 20.

Having pump modules 18 (i.e. attachable/detachable self-contained units) mounted to the housing 12 provides a self-contained hydraulic pump system 10 and reduces or removes the length of piping needed to connect the pumps 22 to the hydraulic fluid 16 contained in the tank 14. This reduces the complexity of the system and reduces or removes energy losses which would occur along such piping. This is particularly beneficial for working vehicles, such as battery-powered working vehicles where reduced energy losses result in increased battery life, or fuel cell powered working vehicles where reduced energy losses result in reduced fuel consumption. In addition, this arrangement is more compact than prior art systems in which the hydraulic pump(s) 22 are provided separate from the tank 14.

It will be understood that the pump modules 18 are each attachable to and detachable from the housing as a self-contained unit. In other words, the pump modules 18 can each be installed or removed from the hydraulic pump system 10 without having to connect/disconnect interconnected components within the pump module 18.

Each hydraulic pump 22 includes a body 24 having a pump inlet 26 and a pump outlet 28. In the illustrated embodiment, the body 24 extends into the tank 14 so that the pump inlet 26 is immersed in hydraulic fluid 16 contained in the tank 14 in use. In alternative embodiments, the body 24 extends partially into the tank 14. For example, in some embodiments part of the body 24 (e.g. an inlet portion) extends into the tank and another part of the body 24 is located external to the tank 14. In some embodiments, the pump inlet 26 is not immersed in hydraulic fluid 16 contained in the tank 14 in use. Having a body 24 extending at least partially into the tank 14 (i.e. into an interior region defined by the housing 12) provides a compact arrangement, since at least part of the body 24 of the hydraulic pump 22 is within an interior of the housing 12, which is useful in space-constrained environments, such as mobile vehicles (e.g. working vehicles).

The housing 12 defines three apertures 30 for receiving the pump modules 18. The mounting portion 20 of each pump module 18 is configured for mounting the pump module 18 around a respective aperture 30 of the housing 12. It will therefore be understood that where the number of pump modules 18 is more or less than in the illustrated embodiment, the number of apertures 30 differs accordingly. Having one or more apertures 30 for receiving the pump modules 18, and a mounting portion 20 on each pump module 18 provides a simple means for mounting the pump modules 18 to the housing 12.

In the illustrated embodiment, the mounting portion 20 of each pump module 18 includes a flange 32 for surrounding a perimeter of an aperture 30 of the housing 12 when the pump module 18 is coupled to the housing 12 in use. Having a flange 32 which surrounds a perimeter of an aperture 30 of the housing 12 allows the aperture 30 to be completely covered by the mounting portion 20 (which is useful for preventing ingress of dirt or debris, and/or leakage of fluid from the aperture 30). Such a flange 32 also provides an abutment surface which indicates when the pump module 18 has been correctly positioned relative to the housing 12.

In alternative embodiments, the mounting portion 20 of each pump module 18 includes a flange which only partially surrounds a perimeter of an aperture 30 of the housing 12. In alternative embodiments, the mounting portion 20 includes a plurality of projections or flanges arranged circumferentially around an aperture 30 of the housing 12 in use.

In the illustrated embodiment, the mounting portion 20 of each pump module 18 is mounted to the housing 12 via a releasable fastening. Having a releasable fastening allows the pump modules 18 to be easily removed/installed for maintenance or replacement purposes.

In particular, the mounting portion 20 includes a plurality of through-holes 34 and the housing 12 includes a corresponding plurality of threaded holes 36. Each through-hole 34 and threaded hole 36 is provided for receiving a bolt (not shown) to couple the pump module 18 to the housing 12 in use. In alternative embodiments, the housing 12 includes a plurality of through-holes 34 and the mounting portion 20 includes a corresponding plurality of threaded holes 36. In alternative embodiments, any other combination of through-holes and/or threaded holes suitable for receiving a fastener is used (e.g. a plurality of through-holes on the housing 12 and a corresponding plurality of through-holes on the mounting portion 20, or a plurality of threaded holes on the housing 12 and a corresponding plurality of threaded holes on the mounting portion 20). It will be understood that the term “through-hole” shall be interpreted as a non-threaded hole, and the term “threaded hole” shall be interpreted as a blind or through-hole comprising threads. Having an arrangement which is suitable for coupling via one or more bolts provides a simple means of releasably mounting the pump modules 18 to the housing 12.

In alternative embodiments, the mounting portion 20 of each pump module 18 is fixedly attached to the housing 12 (e.g. via welding or adhesive). Fixedly attaching the mounting portions 20 to the housing 12 ensures a robust connection and can contribute to sealing of the apertures 30 in which the pump modules 18 are received.

As will be described in more detail below, the hydraulic pump system 10 includes seals for sealing the apertures 30 to prevent leakage of hydraulic fluid 16 from the tank 14. The apertures 30 being sealed in use allows the hydraulic pump system 10 to be used in any orientation (e.g. pump modules 18 can be mounted on a top, side or lower surface of the housing 12) without leakage of hydraulic fluid 16. This provides a more flexible range of uses for the hydraulic pump system 10. Furthermore, being sealed also prevents leakage in mobile applications where hydraulic fluid 16 may move around within the tank 14 (e.g. in a working vehicle due to acceleration forces or travelling over inclined surfaces).

In the illustrated embodiment, the mounting portion 20 of each pump module 18 includes a seal 38 for sealing a respective aperture 30 when the pump module 18 is coupled to the housing 12 in use. A seal 38 (e.g. a compressible seal such as a gasket) offers a reliable means of sealing an aperture 30, particularly under pressure (e.g. a bolting pressure exerted on the compressible seal 38 when the mounting portion 20 is secured to the housing 12 via one or more bolts).

In the illustrated embodiment, the seal 38 of each pump module 18 is provided on a lower surface of the mounting portion 20, so that the seal 38 is provided between the flange 32 and a portion of the housing 12 surrounding the aperture 30.

In alternative embodiments, the mounting portion 20 of each pump module 18 includes a seal surface instead of, or in addition to, the seal 38. For example a flat metal surface intended to form a metal-to-metal seal with the housing when the mounting portion 20 is fixed to the housing under pressure (e.g. bolting pressure).

The hydraulic pump system 10 also includes a plurality of hydraulic supply lines 40 each connected to a respective pump outlet 28 of the pump modules 18 for channelling hydraulic fluid 16 supplied by the pump modules 18 out of the housing 12. Such hydraulic supply lines 40 allow hydraulic fluid 16 supplied by the hydraulic pumps 22 to be used outside the tank 14 (e.g. to move actuators in a hydraulic system for a working vehicle).

In the illustrated embodiment, each pump module 18 includes one of the hydraulic supply lines 40 so that the hydraulic supply lines 40 can be attached/detached from the hydraulic pump system 10 with the respective pump module 18. Each of the hydraulic supply lines 40 being part of a respective pump module 18 allows simple removal/replacement of pump modules 18 without having to connect/disconnect the hydraulic supply line 40 from the associated pump outlet 28.

In the illustrated embodiment, each pump module 18 includes a hydraulic supply port 42 coupled to the hydraulic supply line 40 of the pump module 18 for connection to a hydraulic system in order to supply hydraulic fluid 16 from the pump module 18 to the hydraulic system. Each of the hydraulic supply ports 42 is arranged to be external to the tank 14 when its respective pump module 18 is mounted to the housing 12. Such a hydraulic supply port 42 allows the hydraulic pump modules 18 to be easily connected to a hydraulic system (e.g. for moving hydraulic actuators in a hydraulic system for a working vehicle).

In alternative embodiments, the hydraulic supply ports 42 are provided on the housing 12 rather than the respective pump modules 18.

In the illustrated embodiment, each of the pump modules 18 also includes an electric motor 44 for driving the hydraulic pump 22 of the pump module 18. In embodiments with multiple pump modules 18 such as that illustrated, having an electric motor 44 for each pump module 18 allows flow of hydraulic fluid 16 from each module 18 to be controlled independently of the other modules 18. This allows optimal pump flow rates to be set for each pump module 18, in contrast to prior art hydraulic systems that are driven by an internal combustion engine (ICE) which results in the hydraulic pump(s) outputting hydraulic fluid whenever the ICE is running (even if not required by hydraulically actuated devices of the hydraulic system). In other words, having an electric motor for each pump module leads to improved efficiency of the hydraulic pump system 10, which is particularly beneficial for working vehicles, such as battery-powered working vehicles where increased pump system efficiency results in increased battery life, or fuel cell powered working vehicles where reduced energy losses result in reduced fuel consumption.

Figure 3:
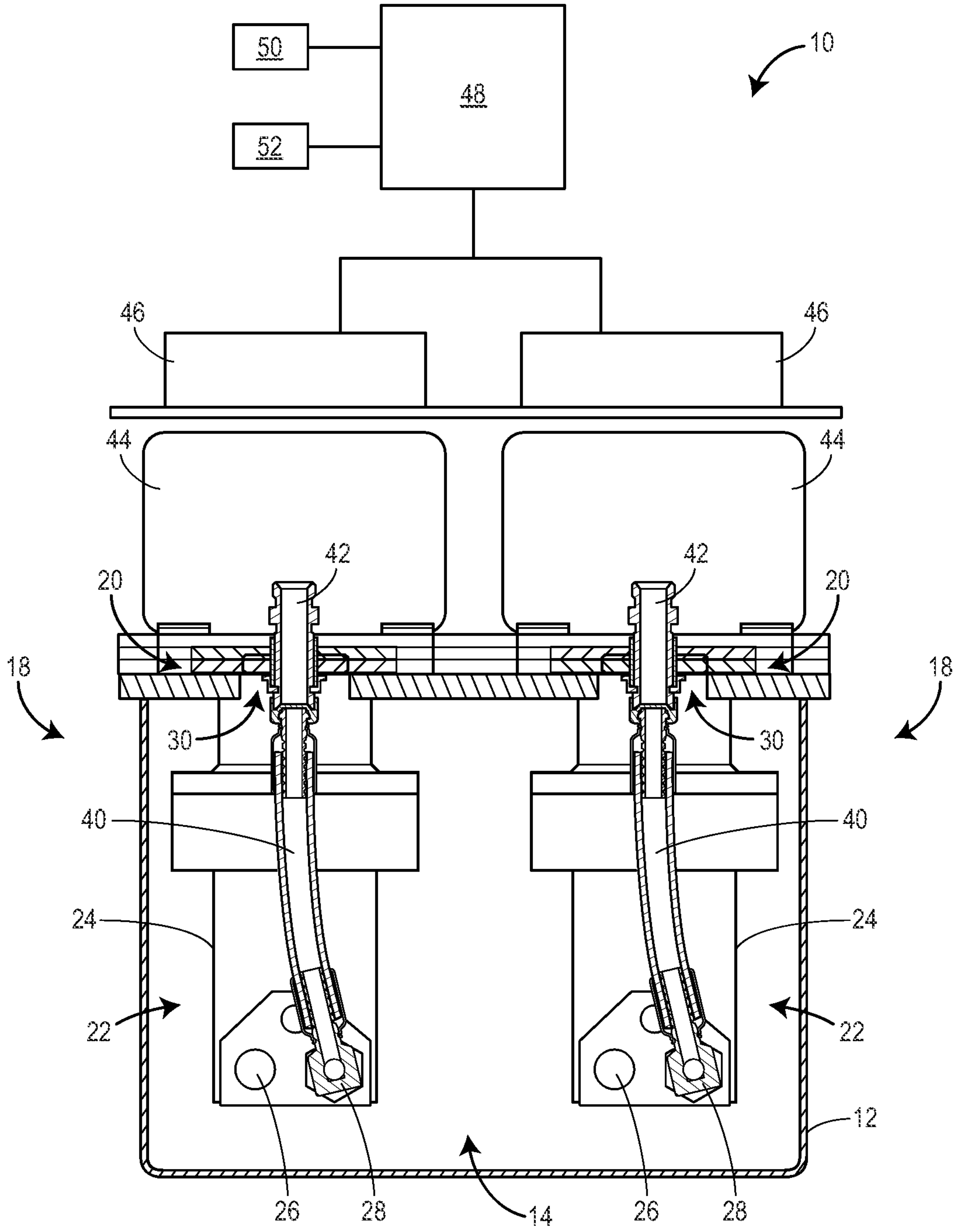
FIG. 3 is a cross-sectional side view of the hydraulic pump system of FIGS. 1 and 2 connected to inverters and a control system.
Figure 4:
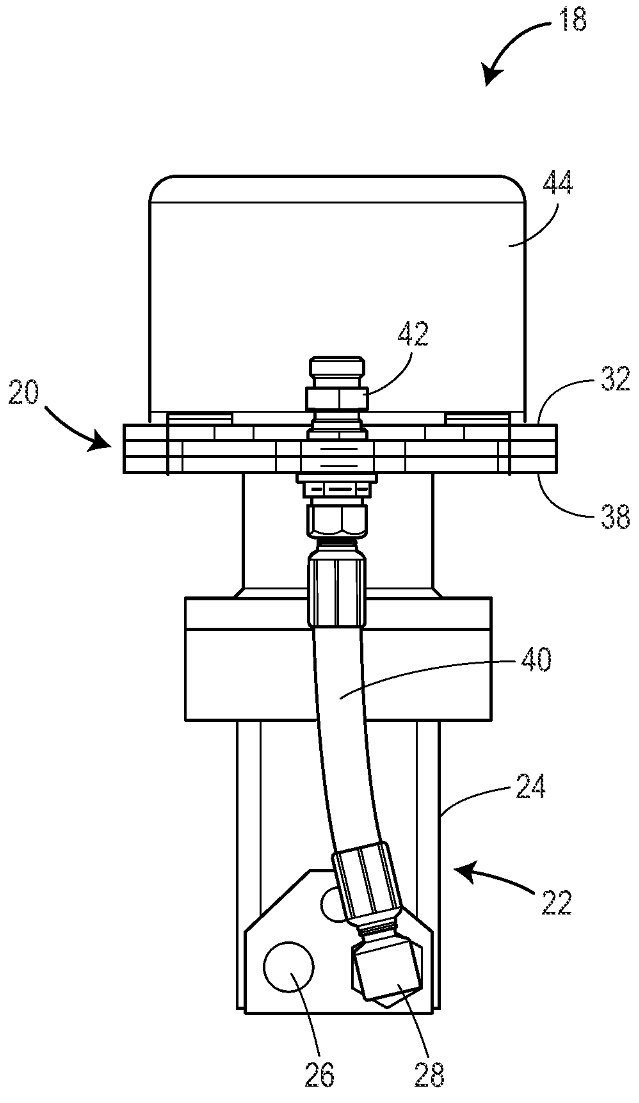
FIG. 4 is a cross-sectional side view of a hydraulic pump module according to an embodiment.

Referring still to FIG. 3, the output of hydraulic fluid 16 from the hydraulic pump 22 of each of the pump modules 18 is controlled via rotation speed of the electric motor 44 of the pump module 18. Having the hydraulic pumps 22 controlled via rotation speed of the electric motors 44 allows an optimal pump flow rate to be set for each pump module 18. This reduces the need for restrictions in downstream hydraulic systems, which improves the efficiency of the associated hydraulic system.

In the illustrated embodiment, the hydraulic system also includes three inverters 46 to control frequency of power supplied to the electric motors 44 of the pump modules 18. Such an inverter arrangement enables variable speed control of the electric motors 44 and DC to AC power smoothing/conversion. This is useful in applications where the electric motors 44 are powered by a DC electricity source (e.g. a battery on an electric working vehicle or a fuel cell on a fuel cell powered vehicle).

In some embodiments, the inverters 46 are each part of a respective pump module 18 so that the inverter 46 can be attached/detached from the hydraulic pump system 10 with said pump module 18. In alternative embodiments, the inverters 46 are provided separate to the pump modules 18. In alternative embodiments, the electric motors 44 are DC motors and the inverters 46 are omitted.

The hydraulic pump system 10 also includes a controller 48 configured to set the rotation speed of the electric motors 44 based on one or more user inputs 50 (such as an operating lever position) and/or one or more sensor inputs 52 (such as pump pressure and system temperature). Such a controller 48 allows an optimal pump flow rate to be set for each pump module 18, which leads to increased efficiency of a hydraulic system incorporating the hydraulic pump system 10.

Referring again to FIG. 1, the electric motor 44 of each pump module 18 is connected to the hydraulic pump 22 of the pump module 18 by a common drive shaft 54. Connecting a hydraulic pump 22 to an electric motor 44 via a common drive shaft 54 offers a simple and reliable means for driving the hydraulic pump 22 by the electric motor 44.

In alternative embodiments, the electric motor 44 of each pump module 18 is connected to the hydraulic pump 22 of the pump module 18 by a gearbox. Connecting a hydraulic pump 22 to an electric motor 44 via a gearbox allows the electric motor 44 and hydraulic pump 22 to each be run in their optimal rotational speed ranges (which may differ), which increases the efficiency of the hydraulic pump system 10.

In the illustrated embodiment, the electric motor 44 of each pump module 18 is arranged so that it is positioned external to the tank 14. Arranging the electric motors 44 to be external to the tank 14 protects electrical components from short-circuiting or other damage caused be contact with hydraulic fluid 16 located within the tank 14 in use.

In some embodiments, the hydraulic pump 22 of each pump module 18 is a fixed displacement pump. For example, in some embodiments the hydraulic pumps 22 are bent axis piston pumps. Having an electric motor 44 driving a fixed displacement pump 22 eliminates the need for variable swash control to vary pump output, which allows an infinite range of output flow rates without inefficiency of partial displacement associated with variable swash plate piston pumps. Furthermore, bent axis piston pumps have been found to offer a high displacement ratio due to large swash angles)(>40°, which results in a power dense package in comparison to axial piston pumps. This provides a high volumetric efficiency, which leads to an increased overall efficiency of the hydraulic pump system 10.

In alternative embodiments, the number of electric motors 44 is less than the number of pump modules 18, so that one or more pump modules are driven by a common electric motor 44. In alternative embodiments, the electric motors 44 are omitted and the pump modules 18 are driven by an internal combustion engine. In some embodiments where the pump modules 18 are driven by an internal combustion engine, the output of hydraulic fluid 16 from the hydraulic pumps 22 of the pump modules 18 is variable for a given rotation rate of the common electric motor 44 or internal combustion engine (e.g. by using a variable swash-plate pump). In such embodiments, a controller is provided to set the swash-plate angle (or similar displacement-changing property of the hydraulic pumps) based on one or more user inputs 50 and/or sensor inputs 52.

In the illustrated embodiment, the hydraulic pump system 10 also includes a filter arrangement 56 for filtering hydraulic fluid 16 input to the tank 14 (e.g. hydraulic fluid 16 returning from one or more hydraulically-actuated devices of a working vehicle). Having such a filter arrangement 56 removes debris entrained in the hydraulic fluid 16 prior to entering the tank 14 (e.g. debris formed via erosion of components in a hydraulic system) which improves the efficiency of the hydraulic system and reduces the likelihood of damage to components such as the hydraulic pump 22. In the illustrated embodiment, the filter arrangement 56 is mounted on the housing 12 and extends partially into the tank 14 similarly to the pump modules 18, which provides a compact and self-contained arrangement. In alternative embodiments, the filter arrangement 56 is provided external to the housing 12 (e.g. as a separate unit connected to the tank 14 via a pipe).

The hydraulic pump system 10 may be used in different applications with different pump requirements. For example, in some embodiments only two pump modules 18 are required. In some embodiments where only two pump modules 18 are required, the housing 12 still includes three apertures 30 for receiving three pump modules 18. Therefore, one of the apertures 30 will not be covered by a pump module 18. In such embodiments, the aperture 30 which is not covered by the pump module 18 is covered by a cover plate of similar shape and size as the mounting portion 20 of the pump modules 18. In this way, the aperture 30 which is not covered by a pump module 18 is covered (and sealed, if the cover plate includes a seal) to prevent influx of debris to the tank 14 or leakage of hydraulic fluid 16 from the tank 14. Such a hydraulic pump system 10 is therefore configurable to meet the requirements of a particular application, by using the same basic integers (i.e. housing 12, pump modules 18 and cover plate).

Referring now to FIGS. 5 to 8, a hydraulic pump system according to a further embodiment is indicated at 210. Common features between the hydraulic pump system of FIGS. 1 to 4 and this embodiment are given the prefix "2", and only differences between the embodiments will be discussed in detail.

Figure 6:
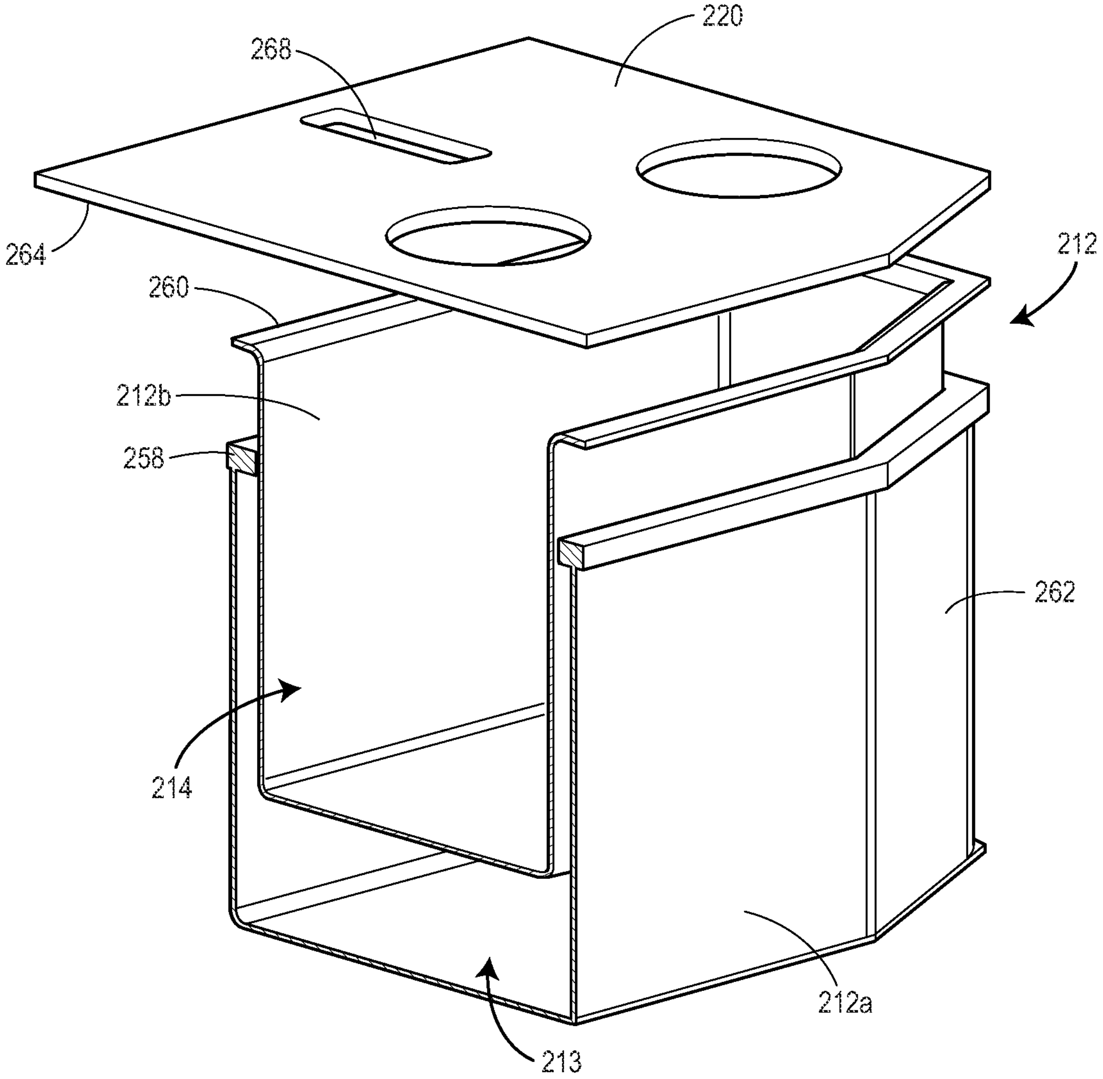
FIG. 6 is an exploded cross-sectional perspective view of the mounting arrangement and housing of the hydraulic pump system of FIG. 5.
Figure 7:
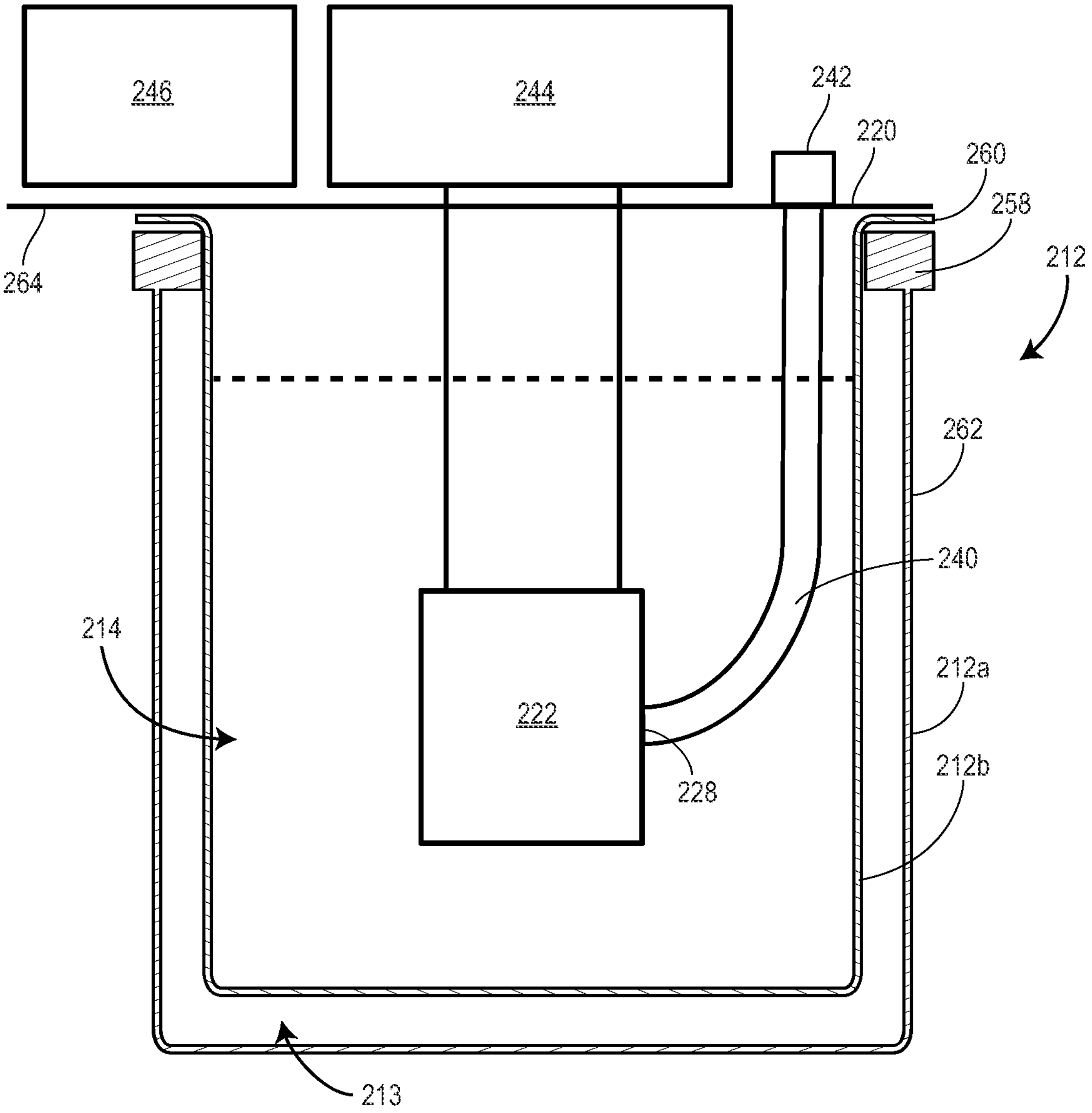
FIG. 7 is a cross-sectional side view of the hydraulic pump system of FIGS. 5 and 6.
Figure 8:
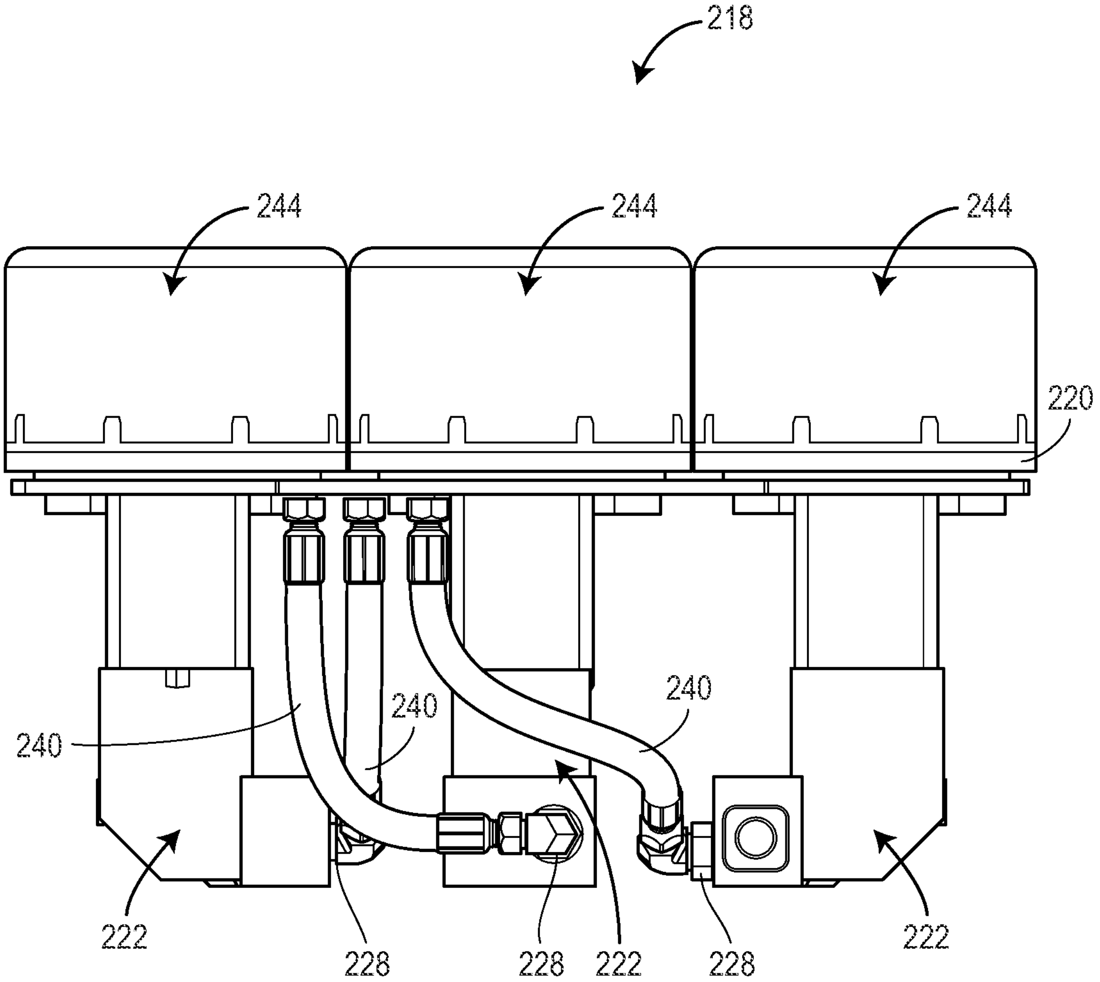
FIG. 8 is a side view of the pump module of the pump system of FIGS. 5 to 7.

The housing 212 includes an outer casing 212*a* and an inner liner 212*b* which defines an interior wall of the tank 214. The inner liner 212*b* is spaced apart from the outer casing 212*a* to define a cavity 213 therebetween (as best illustrated in FIGS. 6 and 7). The cavity 213 reduces the transmission of sound generated by the pumps 222 from within the tank 214 to an exterior of the housing 212. In some embodiments, the cavity 213 contains sound absorbing material to further reduce the amount of noise generated by the pumps 222 that is transmitted to the exterior of the housing 212.

In the embodiment of FIGS. 5 to 8, the outer casing 212*a* has an open end defining a rim 258 and the inner liner 212*b* has an outwardly extending flange 260 for engaging the rim 258. In this way, the outwardly extending flange 260 prevents the inner liner 212*b* from dropping to the base of the outer casing 212*a*, so that the cavity 213 extends underneath the inner liner 212*b*. In alternative embodiments, the inner liner 212*b* has a different type of outwardly extending projection instead of the flange 260 (e.g. a series of outwardly extending projections distributed around the inner liner 212*b*).

The rim 258 of the outer casing 212*a* defines an inwardly extending flange which is configured to space the inner liner 212*b* from the side walls 262*a* of the outer casing 212*a*. In this way, the inwardly extending flange of the rim 258 extends to and abuts against the side walls 262*b* of the inner liner 212*b*, which ensures correct alignment of the inner liner 212*b* within the outer casing 212*a*. In alternative embodiments, the rim 258 has a different type of inwardly extending projection instead of a flange (e.g. a series of inwardly extending projections distributed around the rim 258).

In alternative embodiments, separate spacing components are provided within the cavity 213 to facilitate spacing between the liner 212*b* and the outer casing 212*a* (e.g. in addition to, or instead of, the inwardly extending flange/projection(s) of the rim 258).

In the embodiment of FIGS. 5 to 8, the rim 258 is box shaped (i.e. formed of box sections welded to the side walls 262) and also extends outwardly from the side walls to provide a greater contact area for the flange 260 of the inner liner 212*b* and for the mounting plate 220. In alternative embodiments, the inwardly extending flange of the rim 258 is formed by bending the side walls 262 inwards.

The housing has an open upper end which defines an aperture 230 for receiving the pumps 222, as will be described in more detail below. The aperture 230 is closed by a mounting plate 220. In other words, the mounting plate 220 acts as a lid for the tank 214.

The mounting plate 220, flange 260 of the inner liner 212*b* and/or the rim 258 of the outer casing 212*a* can be clamped or welded together. While not shown in the illustrated embodiment, mounting plate 220, flange 260 of the inner liner 212*b* and/or the rim 258 of the outer casing 212*a* can also be attached by fasteners (e.g. bolts) provided in complementary through-holes or threaded holes in the mounting plate 220, flange 260 of the inner liner 212*b* and/or rim 258 of the outer casing 212*a*. It will be understood that in some embodiments with such through-holes or threaded holes, the outwardly extending portion of the rim 258 is extended to provide space for the holes to receive the fasteners.

In some embodiments, a seal (not shown) is provided between the mounting plate 220 and the housing 212. For example, in some embodiments a compressible seal such as a gasket is attached to an underside of the mounting plate 220 or attached to a top of the flange 260 of the inner liner 212*b*. Alternatively, in some embodiments a compressible seal is provided as a separate component that is placed between the mounting plate 220 and housing 212 during assembly. In some embodiments where a seal is provided between the mounting plate 220 and the housing 212, the seal also has holes aligned with through-holes or threaded holes of the mounting plate 220 and housing 212 to receive a fastener (e.g. bolt) therethrough.

The outer casing 212*a* can be formed of plastics material, metallic material (e.g. steel or aluminium) or any other suitable material. Similarly, the inner liner 212*b* can be formed of plastics material, metallic material (e.g. steel or aluminium) or any other suitable material.

In the embodiment of FIGS. 5 to 8, the mounting plate 220 is configured to mount all of the pumps 222 to the housing 212. In other words, the pump module 218 includes the mounting plate 220, the three pumps 222, and their respective motors 244 and inverters 246, so that all the pumps 222, motors 244 and inverters 246 are installed/removed from the housing 212 together. The hydraulic supply lines 240 each extend from a respective pump outlet 228 to a respective port 242 provided on the common mounting plate 220.

In alternative embodiments, the pumps 222 and their respective motors 244 and inverters 246 are additionally releasably mounted to the mounting plate 220 so that they can be removed/replaced independently of each other. For example, in some embodiments, several pump modules 18 are attached to a common mounting plate 220 by individual mounting portions 20, in the same way that the pump modules 18 of the embodiment of FIGS. 1 to 4 above are attached to an upper surface of the housing 12.

Figure 5:
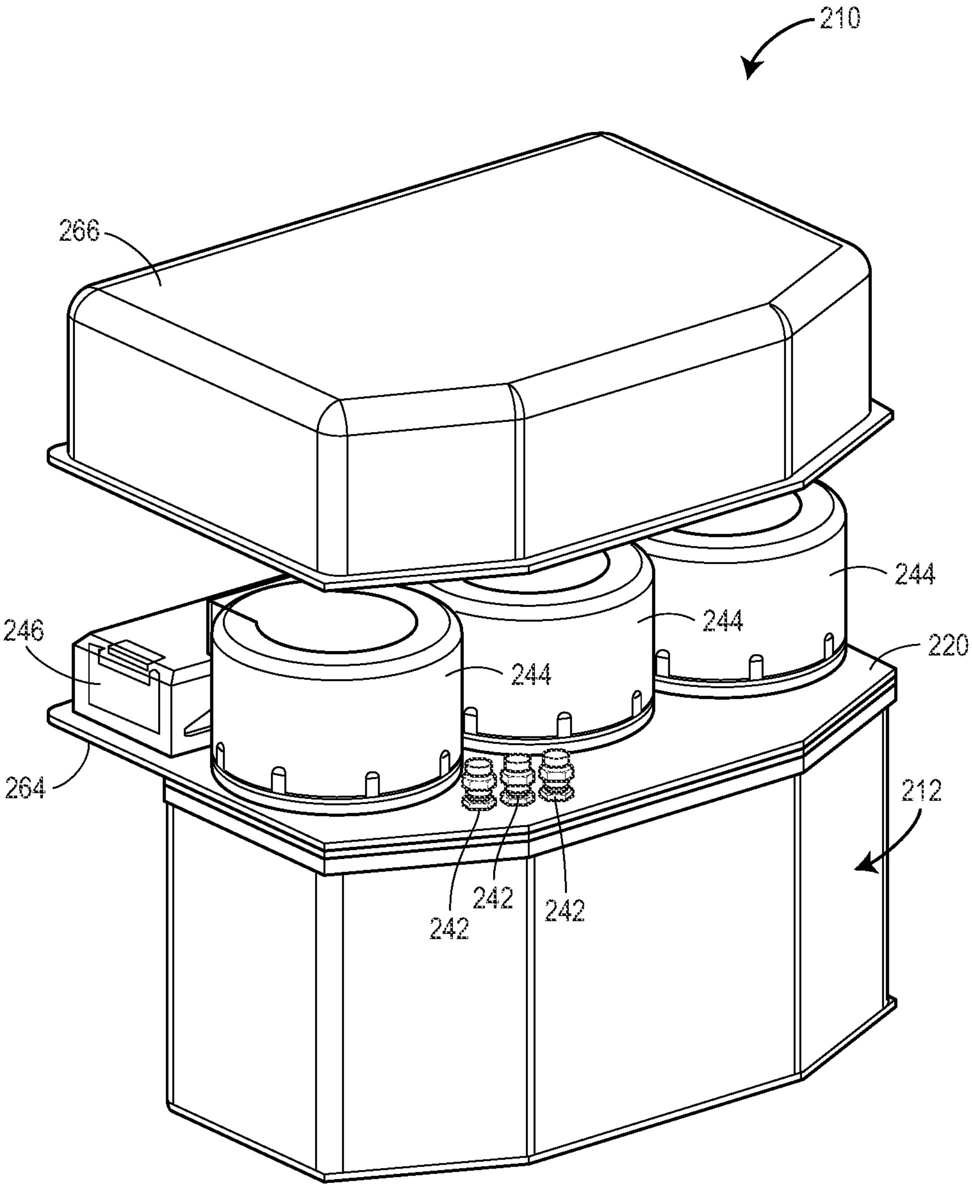
FIG. 5 is a perspective view of a hydraulic pump system having three pump modules according to a further embodiment.

As best illustrated in FIGS. 5 and 6, the mounting plate 220 extends beyond the area defined by the open end of the housing 212 (e.g. behind the housing 212). In this way, the mounting plate 220 provides a shoulder 264 which can be used to mount the hydraulic pump system 210 to a vehicle. The portion of the mounting plate 220 which extends beyond the area defined by the open end of the housing 212 also provides space for mounting additional components such as electronics, filters or the like.

In the embodiment of FIGS. 5 to 8, a cover 266 is provided for the components which are external to the tank 214 (i.e. electric motors 244, inverters 246 and other electronics). The cover 266 protects such components from impact, dirt and debris, and also reduces the transmission of noise generated by these components, which results in a quieter pump system 210.

Although not illustrated, it will be understood that the cover 266 would include one or more suitable apertures, cutaways or the like for access to the hydraulic ports 242 (e.g. to connect hoses thereto).

In some embodiments, the cover 266 includes sound-absorbing material (e.g. lined on an inside of the cover 266).

The cover 266 can be formed of plastics material, metallic material (e.g. steel or aluminium) or any other suitable material.

As illustrated in FIG. 6, the mounting plate 220 includes a slot 268 for allowing airflow inside the cover 266 (e.g. for cooling the electronic components located therein). In alternative embodiments, such a slot 268 is provided in the cover 266, or a plurality of such slots 268 are provided in the mounting plate 220 and/or cover 266.

Figure 9:
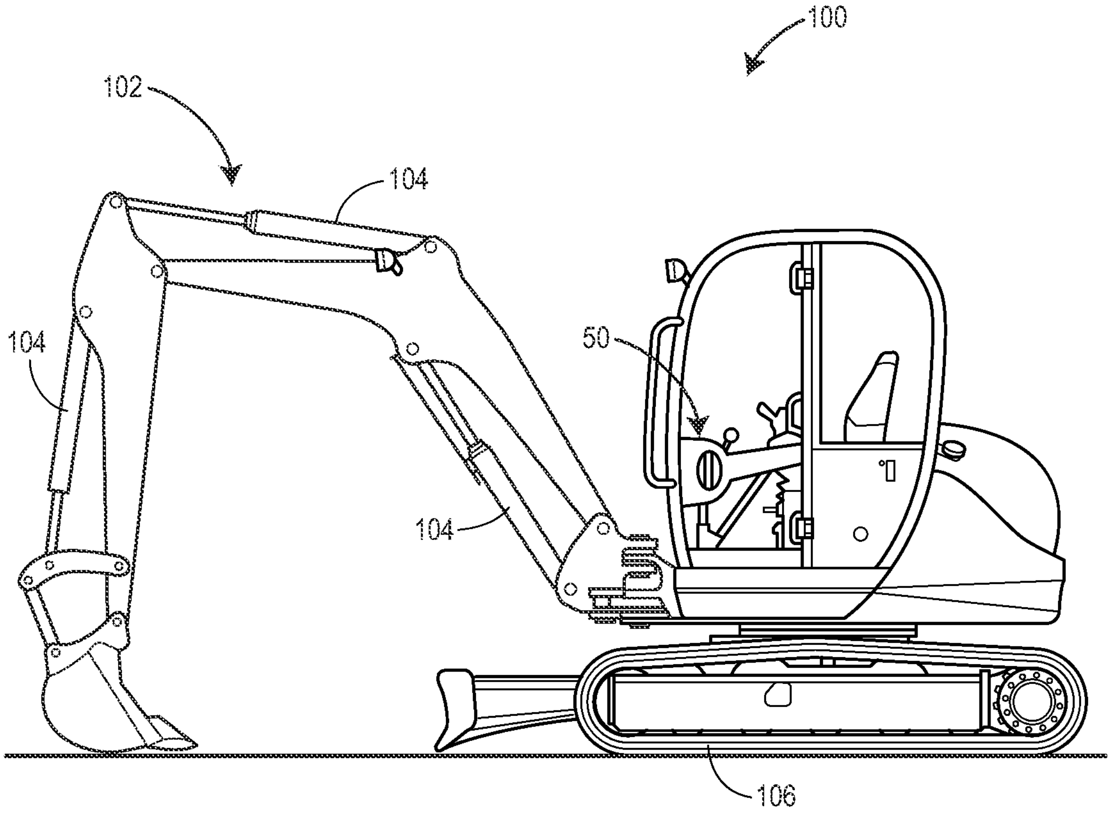
FIG. 9 is a side view of a working machine including the hydraulic pump system of FIGS. 1 to 3 or 5 to 7.

Referring now to FIG. 9, a working vehicle according to an embodiment is indicated at 100. The working vehicle 100 includes a working arm 102 controlled by a plurality of hydraulic actuators 104. The working vehicle 100 also includes a pair of left and right tracks 106 for moving the working vehicle 100. The left and right tracks 106 are driven by respective hydraulic motors. A set of user inputs 50 (e.g. joy-sticks, levers, buttons, pedals etc.) are provided on the working vehicle 100 for controlling movement of the working vehicle 100 and the working arm 102.

The working vehicle 100 also includes a hydraulic pump system 10 as described above in relation to FIGS. 1 to 4 or a hydraulic pump system 210 as described above in relation to FIGS. 5 to 8. The hydraulic pump system 10, 210 is provided to supply hydraulic fluid 16 to the hydraulic actuators 104 and left/right track motors of the working vehicle 100. As has been outlined above, the hydraulic pump systems 10, 210 of FIGS. 1 to 4 and 5 to 8 are particularly compact and efficient. This provides significant benefits when applied to a working vehicle 100 (where space is restricted and power is of limited capacity), particularly when the working vehicle 100 is an electric working vehicle where increased efficiency results in increased battery life and periods of use between charging, or a fuel cell powered working vehicle where reduced energy losses result in reduced fuel consumption.

In the illustrated embodiment, the working vehicle 100 is of the type known as an excavator. In alternative embodiments, the working vehicle is a different type of vehicle. For example, in some embodiments the working vehicle is a backhoe loader, telehandler, skid-steer loader, dumper, forklift truck or other type of working vehicle having one or more hydraulically-actuated devices.

In alternative embodiments, the hydraulic pump system 10, 210 is part of a hydraulic system of a static application rather than a mobile application such as a working vehicle (e.g. the hydraulic pump system 10, 210 is part of an industrial hydraulic system in a manufacturing or processing plant).

The term "module" used throughout this description is to be interpreted as an attachable/detachable self-contained unit comprising components that can be installed in or removed from the hydraulic pump system 10 as a single unit, i.e. without having to connect/disconnect interconnected components of the module to or from one another.

Although the disclosure has been described in relation to one or more embodiments, it will be appreciated that various changes or modifications can be made without departing from the scope defined by the appended claims. For example:

- the pump system 10, 210 may be configured for supplying fluid different to a hydraulic fluid to a different type of fluid system, e.g. the pumps may be cooling oil/water pumps for pumping cooling oil/water in a cooling fluid system;

the number of pumps 22, 222 and pump modules 18, 218 may be more or less than in the illustrated embodiments;

- the pump modules 18, 218 may be entirely contained within the tank 14, 214 (e.g. electric motors 44, 244 may be located within an interior of the tank with only power/signal cables and hydraulic supply ports 42, 242 passing through the housing 12, 212);
- the mounting portions 20, 220 may be of different shape and/or configuration;
- the inverters 46, 246 may be integral to the pump modules 18, 218, or may be part of a separate assembly operably coupled to the pump modules 18, 218;
- the electric motors 44, 244 may be DC motors and the inverters 46, 246 may be omitted;
- the hydraulic pumps 22, 222 of the pump modules 18, 218 may be of any suitable type (e.g. of different type or configuration to the bent axis piston pumps described above);
- the pump modules 18, 218 may be mounted to the housing 12, 212 via a different means to the through-holes 34 and threaded holes 36 (e.g. via welding or adhesive); and
- the filter arrangement 56 may be external to the housing 12, 212 (e.g. as a separate unit connected to the tank 14, 214 via a pipe).

It should also be noted that whilst the appended claims set out particular combinations of features described above, the scope of the present disclosure is not limited to the particular combinations hereafter claimed, but instead extends to encompass each feature herein disclosed in isolation, as well as any combination of features herein disclosed.

The invention claimed is:

1. A hydraulic pump system comprising:

a housing defining a tank containing a hydraulic fluid;

a plurality of pump modules, each of the plurality of pump modules comprising a hydraulic pump for pumping the hydraulic fluid from the tank, and a plurality of electric motors, each of the electric motors for driving a corresponding one the hydraulic pumps;

a mounting arrangement;

wherein each of the plurality of pump modules is mounted to the housing by the mounting arrangement; wherein each of the hydraulic pumps includes a pump body, a pump inlet, and a pump outlet, at least a portion of each pump body sized to fit within a corresponding aperture into the tank, such that each pump inlet, each pump outlet, and at least a portion of each pump body is disposed within the tank; and wherein each of the pump modules includes a hydraulic supply port passing through the mounting arrangement and connected to the pump outlet via a hydraulic supply line, and further wherein the hydraulic supply line is disposed within the tank but outside of the pump body.

2. The hydraulic pump system according to claim 1, wherein the mounting arrangement comprises one or more mounting portions, and wherein each hydraulic pump is mounted to the housing via a corresponding one of the mounting portions.

3. The hydraulic pump system according to claim 1, wherein the housing comprises an outer casing, and an inner liner spaced apart from the outer casing to define a cavity therebetween.

4. The hydraulic pump system according to claim 1, wherein the tank is surrounded by sound absorbing material.

5. The hydraulic pump system according to claim 1, wherein the mounting arrangement comprises one or more plates or flanges, each of the one or more plates or flanges at least partially surrounding a perimeter of the corresponding aperture of the housing.

6. The hydraulic pump system according to claim 1, wherein the mounting arrangement is mounted to the housing via a releasable threaded fastening.

7. The hydraulic pump system according to claim 5, further comprising one or more seals for sealing the corresponding aperture.

8. The hydraulic pump system according to claim 7, wherein each of the one or more plates or flanges further comprises a seal surface and/or the one or more seals are provided on said plate or flange for sealing each of said one or more apertures.

9. The hydraulic pump system according to claim 1, wherein an inlet portion of the body extends into the tank such that the pump inlet is immersed in the hydraulic fluid contained in the tank; and/or wherein the hydraulic pump system further comprises a filter or strainer arrangement coupled to the pump inlet, wherein the pump inlet portion of the body extends into the tank such that the filter or strainer arrangement is immersed in the hydraulic fluid contained in the tank in use.

10. The hydraulic pump system according to claim 1, wherein each of the hydraulic supply lines is coupled to the mounting arrangement so that said hydraulic supply lines can be attached/detached from the hydraulic pump system with the respective pump modules.

11. The hydraulic pump system according to claim 1, further comprising a controller configured to set a rotation speed of each electric motor based on one or more user inputs and/or one or more sensor inputs.

12. The hydraulic pump system according to claim 1, wherein each of the electric motors and inverters are arranged to be positioned external to the tank, and wherein the hydraulic pump system further comprises a cover for each electric motor of the plurality of pump modules, the cover being attached to the housing and/or the mounting arrangement, wherein the cover defines an internal space and wherein each of the electric motors of the plurality of pump modules is located within the internal space.

13. The hydraulic pump system according to claim 1, wherein the hydraulic pump of each of the plurality of pump modules is a fixed displacement pump or a bent axis piston pump.

14. The hydraulic pump system according to claim 1, and further comprising a return input having a filter arrangement for filtering hydraulic fluid input to the tank, and wherein the filter arrangement is mounted on the housing or the mounting arrangement, and wherein the filter arrangement extends at least partially into the tank.

15. A working vehicle comprised of the hydraulic pump system of claim 1, wherein the working vehicle is a battery-powered working vehicle.

16. The hydraulic pump system of claim 1, comprising a cover for at least one of the electric motors.

17. A hydraulic pump system comprising:

a housing defining an enclosed tank for containing a hydraulic fluid, the housing including a mounting plate, the mounting plate having a plurality of apertures;

a plurality of pump modules, each of the pump modules comprising a hydraulic pump, each pump module further including an electric motor for driving a corresponding one of the hydraulic pumps;

a controller operatively coupled to the electric motors and arranged to control a rotational speed of the electric motors;

each of the pump modules further including a mounting portion sized and positioned to overlie and be connected to the mounting plate;

each of the hydraulic pumps having a pump body, a pump inlet, and a pump outlet, at least a portion of each pump body sized to fit within a corresponding one of the plurality of apertures of the mounting plate, such that each pump inlet, pump outlet, and at least the portion of each pump body is disposed within the tank; and further including a hydraulic supply port passing through the housing and connected to the pump outlet via a hydraulic supply line, the hydraulic supply line disposed within the tank but outside of the pump body;

wherein each of the pump modules can be installed or removed from the tank as a self-contained unit.

18. The hydraulic pump system of claim 17, wherein the plurality of pump modules can be installed onto or removed from the tank together as a self-contained unit.

19. The hydraulic pump system of claim 17, wherein the mounting plate comprises a lid for the housing.

20. The hydraulic pump system of claim 17, wherein each hydraulic supply port passes through the mounting plate.

21. The hydraulic pump system of claim 17, wherein each hydraulic supply port passes through the mounting arrangement.

22. A hydraulic pump system comprising:

a housing defining an enclosed tank for containing a hydraulic fluid, the housing including a plurality of apertures;

a plurality of pump modules, each of the pump modules comprising a hydraulic pump for pumping the hydraulic fluid from the tank, each pump module including an electric motor for driving a corresponding one of the hydraulic pumps, each pump module including a flange which at least partially surrounds a corresponding one of the plurality of apertures;

a controller operatively coupled to each of the electric motors and arranged to control a rotational speed of each of the electric motors;

each of the hydraulic pumps including a pump body disposed at least partially in the tank through a corresponding one of the apertures in the mounting plate;

each of the hydraulic pumps having a pump inlet and a pump outlet disposed within the tank, the pump outlet connected via a hydraulic supply line to a hydraulic supply port extending through a corresponding one of the flanges, the hydraulic supply line being disposed within the tank but outside of the pump body; and wherein each of the plurality of pump modules can be installed or removed from the tank as a self-contained unit with the hydraulic supply line and hydraulic supply port.

* * * * *